US008616457B2

(12) United States Patent
Krawczewicz et al.

(10) Patent No.: US 8,616,457 B2
(45) Date of Patent: Dec. 31, 2013

(54) RFID DISPLAY LABEL FOR BATTERY PACKS

(76) Inventors: Mark Stanley Krawczewicz, Annapolis, MD (US); Jay Steinmetz, Balt, MD (US)

( * ) Notice: Subject to any disclaimer, the term of this patent is extended or adjusted under 35 U.S.C. 154(b) by 0 days.

(21) Appl. No.: 13/303,128

(22) Filed: Nov. 22, 2011

(65) Prior Publication Data
US 2012/0211569 A1 Aug. 23, 2012

Related U.S. Application Data (60) Provisional application No. 61/416,109, filed on Nov. 22, 2010.

(51) Int. Cl.
*G06K 19/06* (2006.01)
(52) U.S. Cl.
USPC .......................... 235/492; 235/451
(58) Field of Classification Search
USPC .................. 235/492, 451; 340/10.6, 572.1
See application file for complete search history.

(56) References Cited

U.S. PATENT DOCUMENTS

| 6,014,141 | A * | 1/2000 | Klein .......................... 715/835 |
| 6,476,718 | B1 | 11/2002 | Cartwright et al. |
| 7,270,276 | B2 | 9/2007 | Vayssiere |
| 7,584,896 | B2 | 9/2009 | Warther et al. |
| 7,845,569 | B1 | 12/2010 | Warther et al. |
| 2005/0258229 | A1 | 11/2005 | Minemura |
| 2009/0134223 | A1 | 5/2009 | Matthews et al. |
| 2009/0152364 | A1 | 6/2009 | Spivey, Jr. |
| 2009/0199004 | A1 | 8/2009 | Krawczewicz et al. |
| 2009/0206994 | A1 | 8/2009 | Lee |
| 2009/0218395 | A1 | 9/2009 | Chien et al. |
| 2009/0248333 | A1 * | 10/2009 | Grosberg et al. ............... 702/63 |
| 2009/0254438 | A1 | 10/2009 | Johnson, Jr. et al. |
| 2009/0289762 | A1 | 11/2009 | Tassy et al. |
| 2009/0295749 | A1 | 12/2009 | Sato et al. |
| 2009/0309736 | A1 | 12/2009 | Heurtier |
| 2009/0321516 | A1 | 12/2009 | Yang |
| 2010/0019905 | A1 | 1/2010 | Boddie et al. |
| 2010/0033307 | A1 | 2/2010 | Narendra et al. |
| 2010/0033310 | A1 | 2/2010 | Narendra et al. |
| 2010/0039265 | A1 | 2/2010 | Spivey, Jr. |
| 2010/0052908 | A1 * | 3/2010 | Doan et al. .................. 340/572.1 |
| 2010/0066497 | A1 | 3/2010 | Lim et al. |
| 2010/0079416 | A1 | 4/2010 | Chung et al. |
| 2010/0117800 | A1 | 5/2010 | Li et al. |
| 2011/0289023 | A1 * | 11/2011 | Forster et al. ................. 705/500 |
| 2012/0182132 | A1 * | 7/2012 | McShane et al. .......... 340/10.51 |

FOREIGN PATENT DOCUMENTS

WO    WO 00/36560    6/2000

* cited by examiner

*Primary Examiner* — Ahshik Kim
(74) *Attorney, Agent, or Firm* — 24IP Law Group; Timothy R. DeWitt (57) ABSTRACT

A smart battery label having an RFID or UHF antenna, sensors to monitor battery environmental data and a bi-state display for displaying battery data.

11 Claims, 7 Drawing Sheets

RFID DISPLAY LABEL FOR BATTERY PACKS

CROSS-REFERENCE TO RELATED APPLICATIONS

The present application claims the benefit of the filing date of U.S. Provisional Application Ser. No. 61/416,109 entitled "RFID Battery Display Label" filed by the present inventors on Nov. 22, 2010.

The present application is related to co-pending U.S. Non-provisional patent application Ser. No. 13/278,126 entitled "Mobile Payment System with Thin-Film Display" and filed by Mark Krawczewicz, Jay Steinmetz and David Eagleson on Oct. 20, 2011.

The above cross-referenced related applications are hereby incorporated by reference herein in its entirety.

STATEMENT REGARDING FEDERALLY SPONSORED RESEARCH OR DEVELOPMENT

None.

BACKGROUND OF THE INVENTION

1. Field of the Invention

The present invention relates to RFID labels, and more specifically, to RFID labels with displays.

2. Brief Description of the Related Art

In recent years, RFID cards have become increasingly prevalent. The have been incorporated into many diverse fields. For example, RFID readers and cards have been incorporated into bill/coin acceptors (U.S. Pat. Pub. No. 2009/0321516 and 2009/0218395), tracking systems (U.S. Pat. Pub. No. 2010/0066497 and 2010/0019905), authenticatable badges (U.S. Pat. Pub. No. 2009/0289762), and commodity displays (U.S. Pat. Pub. No. 2009/0295749). Advances have been made in some instances to provide RFID cards that receive power from a host device rather than having a battery incorporated into the card (U.S. Patent App. Pub. 2010/0033310, 2010/033307 and 2009/0206994).

Recently, efforts have been made to incorporate displays into RFID cards and tags. For example, in U.S. Patent App. Pub. No. 2010/0052908 entitled "Transient State Information Display in an RFID Tag," a display is incorporated into an RFID card to show a transient state such as an age of a product. In the preferred embodiment disclosed in that patent, a card or tag reader provides a current date while the card provides the expiration date of the product. Based on a comparison of those two, an LED is illuminated to reflect the status of the product. The disclosure indicates that a variety of other types of displays may be used and also that the card may be active or passive. In another example, U.S. Patent App. Pub. No. 2010/0079416 entitled "Radio Frequency Identification (RFID), Display Pixel, and Display Panel and Display Apparatus Using RFID Display Pixel" discloses an RFID tag connected to an "RFID pixel" or plurality of "RFID pixels." Another example is described in U.S. Patent App. Pub. No. 2009/0309736 entitled "Multifunction Contactless Electronic Tag for Goods."

It has become very important for designers and customers of products using rechargable battery packs for electric vehicles, medical devices like pacemakers, and other applications to precisely know:

How many times the batteries have been recharge

How much charge of the battery packs have been discharged

If the battery packs have been over charged, experienced out-of-specification temperature, pressure, shock, water, or other detrimental factors that would shorten the life of the batteries

SUMMARY OF THE INVENTION

In a preferred embodiment, the present invention is a smart battery label having UHF and/or RFID capabilities and a bi-state display. In a preferred embodiment, the smart battery pack label comprises a housing, a processor, a near-field and/or UHF antenna, a bi-state display and in some embodiments a sensor or sensors. The processor, bi-state display and sensors may be powered by energy received through the near-field antenna. The energy supplied through the near-field antenna may be provided by a reader within a battery pack or by an external reader.

In another embodiment of the present invention, the smart label circuitry is continuously powered by a secondary coil within the battery unit which induces power through a magnetic field. This configuration would provide un-interrupted continuous power to the battery label to power the processor, display, memory, and monitoring sensors like under/over Voltage, under/over temperature, and shock.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
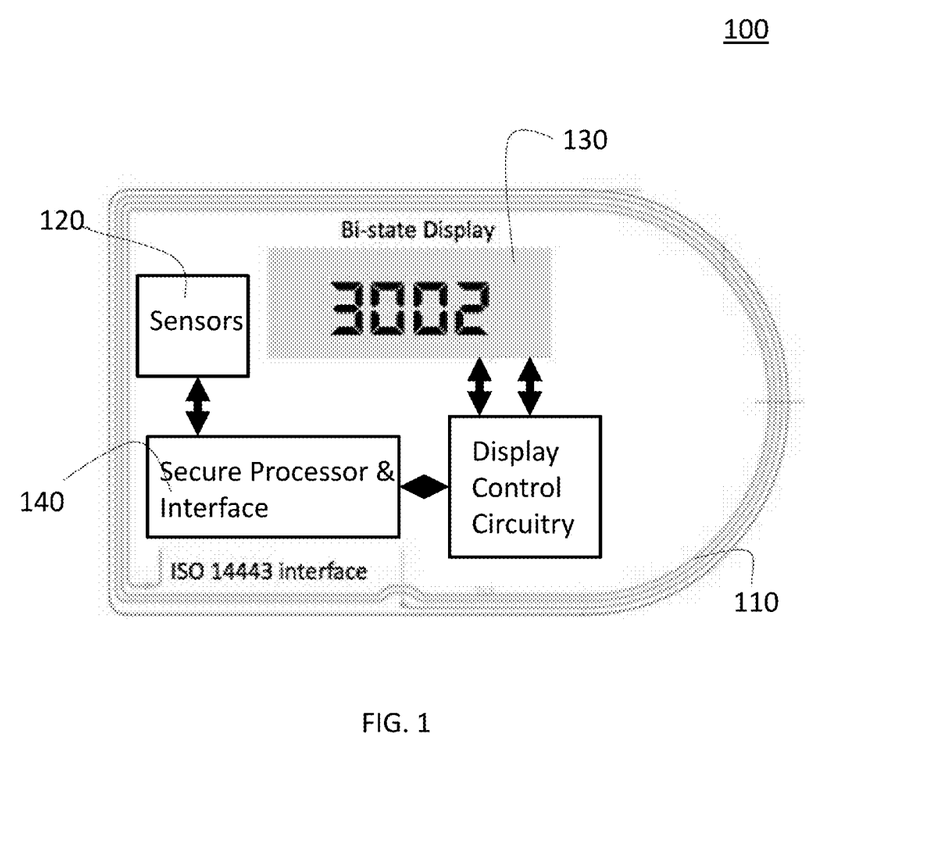
FIG. 1 is a diagram of a smart label for a battery pack in accordance with a preferred embodiment of the present invention.

In a preferred embodiment, the present invention is a smart display label containing a thin film circuit. As shown in FIG. 1, the smart display label 100 has an RFID near-field and/or UHF antenna 110 to couple power and data into card through the internal sealed battery case. The card may be powered by a reader within the battery pack. The card or label also may be powered up from an outside RFID reader to read or to scroll through display. Sensors 120 in the label 100 monitor external environmental ranges the battery unit was exposed to such as temperature, humidity, accelerometer, and shock, etc. A bi-state display 130 maintains the display state without the need of a battery or RF energy. This display data would include data such as number of recharge cycles, temperature and other sensor data, percentage of total battery discharge, and other relevant data. The displayed data may be data provided to the card from control circuitry within the battery pack. The label 100 may be self adhesive or may be embedded into the casing of the battery pack during the manufacturing process. A security processor 140 writes to the display, the display buffer memory, and internal chip memory. A tamper proof seal such as a holographic film may be paced over the display label to show if the tag has been tampered or removed.

Figure 2:
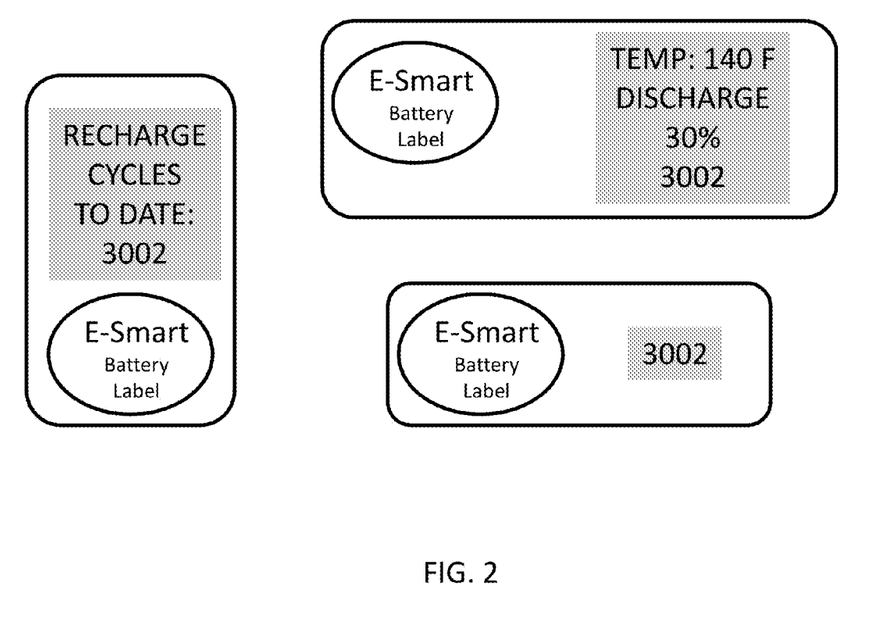
FIG. 2 illustrates various single and multi-line configurations for the smart label for a battery pack in accordance with a preferred embodiment of the present invention.

In FIG. 1, the display 130 is shown as a single line, but the present invention has the functionality to buffer up more text in memory and scroll. Another embodiment of the design, such as is shown in FIG. 2, incorporates a multiple multi line display to show more visual data, such as recharge cycles since last service, temperature, or discharge percentage. Other information similarly may be displayed. The label can be encapsulated in any type of packaging or configuration layout.

Figure 3:
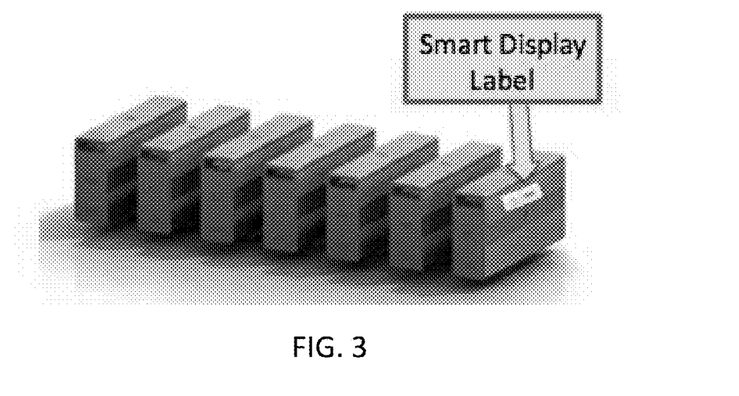
FIG. 3 illustrates a typical commercial battery unit being developed for the auto industry. It is comprised of several separate units (7) that are combined in series to power the AC or DC motors to propel the vehicle.
Figure 4:
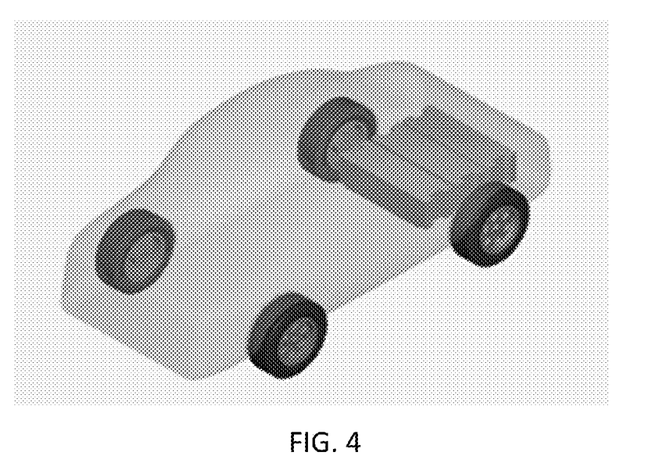
FIG. 4 is a diagram illustrating placement in an automobile of a battery pack having a smart label in accordance with a preferred embodiment of the present invention.
Figure 5:
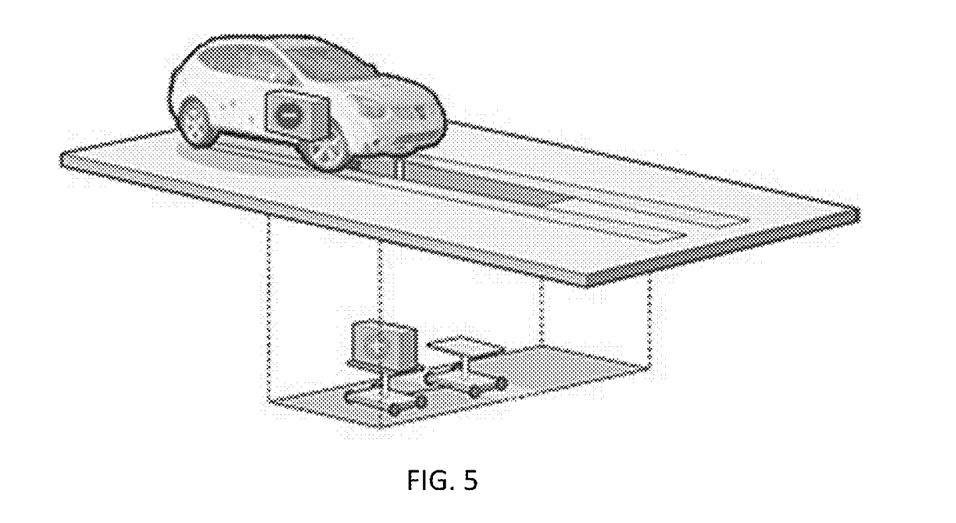
FIG. 5 is a diagram of a setup of a service station having a system incorporating a smart label and reader in accordance with a preferred embodiment of the present invention.
Figure 6:
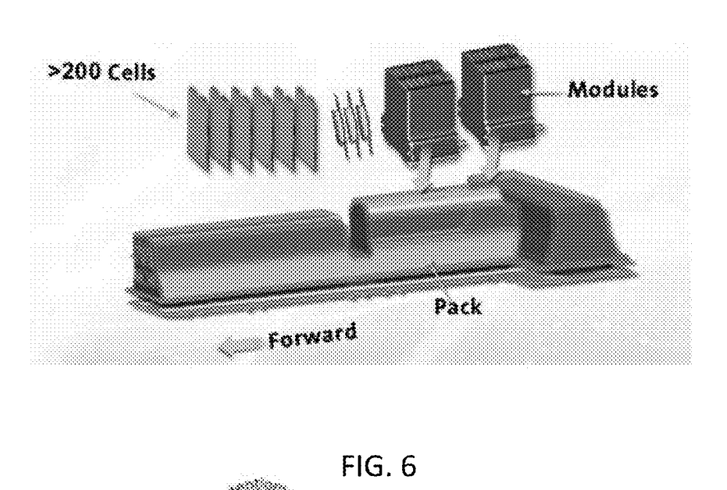
FIG. 6 illustrates a battery system comprising battery management system, thermal management system, and network communications
Figure 7A:
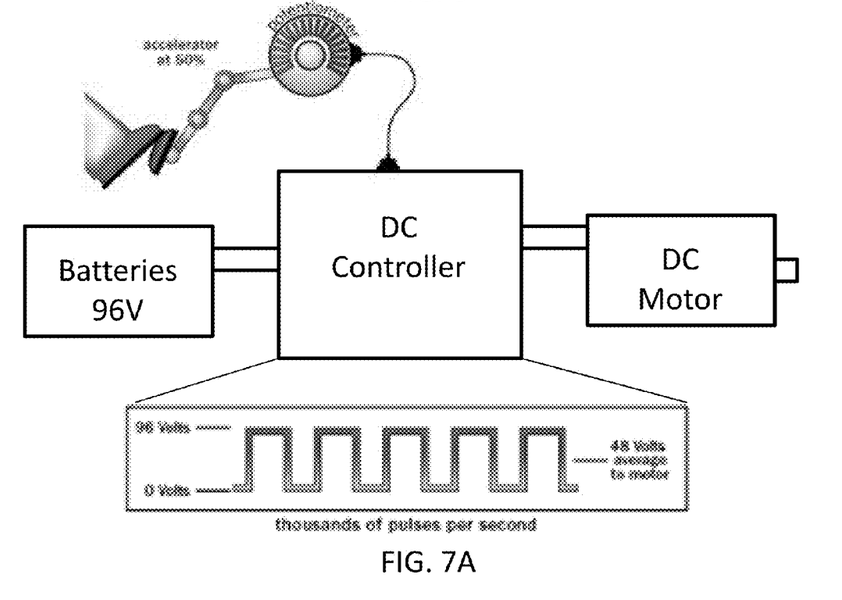
FIGS. 7A and 7B are diagrams of AC and DC motor systems that may be used with smart labels in accordance with the present invention.
Figure 7B:
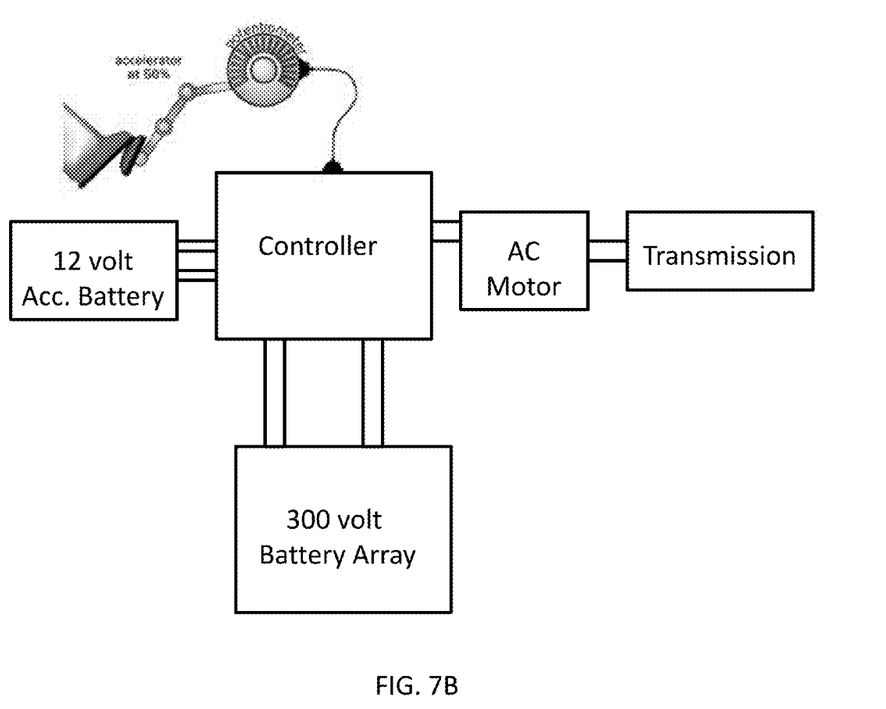

FIG. 3 shows a typical commercial battery unit being developed for the auto industry. It is comprised of several separate units (7) that are combined in series to power the AC or DC motors to propel the vehicle. The smart battery labels in accordance with the present invention may be applied, for example, to the outside plastic casing of each of these units. Alternatively, the components of the display label of the present invention may be built into the batter pack itself. The label is powered through RFID energy coil that is inside each battery module. The casing of the power modules must be completely sealed to prevent potential explosive combustion outside elements like water. Automobile batteries must withstand snow, sleet, rain, heat waves, potholes, and sadistic car laboratory tests that involve getting punched with nails, dropped from 30 feet, repeatedly overcharged, and then discharged to zero.

The electro chemical battery technology has matured to where they will last 10 years before they need replacement. This is a significant and important milestone yet not without a downside. The downside is that the battery units for an electric vehicle can cost up to half the price of the entire vehicle cost or between $10,000 and $20,000.

If and electric car battery unit has been charged 3002 times, even using the new battery technology, the battery must be replaced in approximately 17 months. This patent directly monitors and displays the charging cycles to indicate to the customer how much life is left in the most expensive component of the vehicle.

The industry understands the battery life cycle and has proposed a economic solution in three ways: (1) continue to lower the manufacturing costs; (2) extending the re-charge cycles; and (3) improving efficiencies of the existing battery technology. The pace of both the innovation in battery chemistry and manufacturing is rapid. The NiMH batteries found in today's hybrid cars are high-power (short bursts of speed, quickly recharged). All electric cars use a completely new type of doped nanophosphate battery technology. They deliver long-life, great power high energy density and are heat resilience and vibration resilience. Included with the price of purchase of the vehicle, a pre-paid full battery replacement. As an example of this, the Tesla Roadster charged approximately $12,000 in 2010.

An alternative system approach to address the latency time requires charging of fully drained electric vehicle batteries. For example, if a national infrastructure was created to swap out old batteries with newer ones after each discharge, the electric stations would benefit from this invention providing an accurate means of the remaining life or capacity of the battery units. Creating a charging infrastructures which could verify, track, and predict the quality and lifecycle of every battery being process also dove would manage power supply and demand more efficiently. The batteries could be swapped for each charge or after years of home charges. If at 75 or 100 mile intervals, the user can conveniently replace the partially spent battery with a fresh or fully charged battery, the limit of safe travel is extended. Battery exchange/charge station is also known as battery swap station or battery switch station. This invention provides the secure means to accurately measure and track the remaining battery capacity or if the battery has experienced and recorded out-of-specification events like over-charged, undercharged, Over/Under Temperature, Over/Under Pressure, shock, water or chemical exposure any of which could significantly shorten the life and value of the battery to an independent agent like a electric vehicle swapping station.

Standard Size Battery Modules: There is a push to have standard battery packs for all electric cars so that replacement or swapping can be more cost efficient. In general multiple smaller size battery packs instead of one large battery pack is preferred, however, as a secure display label, the present invention provides critical battery data to an independent agent like a battery swapping station. Furthermore, having a standard connectors and display label for each battery module would have the following advantages for electric vehicles:

Smaller interoperable battery modules with smart label tags would more rapidly expand market.

Battery swapping stations could replace the depleted battery packs from information provided on from two secured means; the visual and digital data stored on the smart label Faster process to have each battery pack ready for charge and transfer A bad battery pack's cell replaced could be scanned through the NFC label interface to transfer and update the metrics for each battery to either the swapping station network or the owner's database.

The present invention provides measured data of the charging life cycles of individual battery packs reduce the costs and increase the efficiencies of the battery swapping stations.

A complete battery system includes battery management system, thermal management system, and network communications. Smart display labels are applicable for electric cars can use for AC or DC electric vehicle motors. The battery modules are different since they are comprised of a different number of internal cells due to the voltage. If the motor uses a DC motor, then it may run on anything from 96 to 192 volts.

The smart label invention for DC electric car motors can also be employed for electric forklifts, fleet trucks, and commercial busses, trains, monorail and more.

The invention for AC motor applications are typically three-phase running at 240 volts AC with a 300 volt battery pack. They are more common and found in most industrial equipment and this invention applies to recording charging data during braking During braking, the motor turns into a generator and delivers power back to the batteries. Again, the smart battery label would capture, store, and display charging cycles from onboard generators.

The Display

The display is a segmented electrophoretic display (E ink), which does not require any power to keep its visible information.

The display contains 10 digits alpha-numerics and two decimal points. The software at the secure controller can drive the display through a supplied SW library.

Figure 8A:
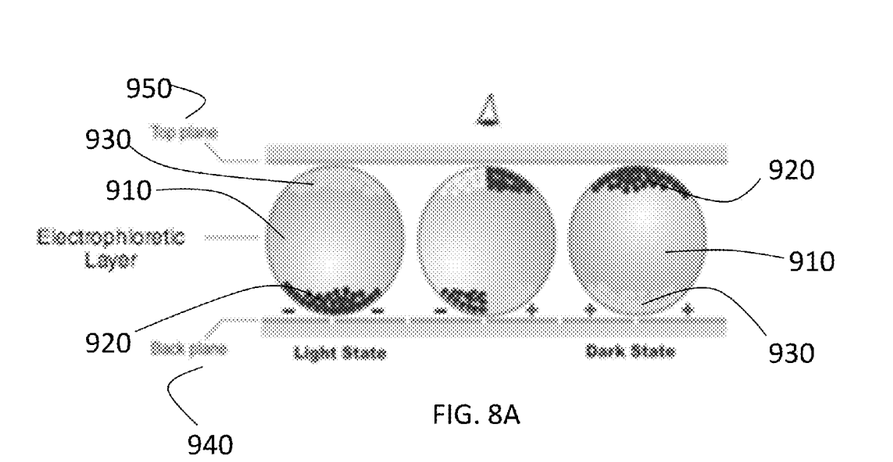
FIG. 8A is a cross sectional view of an E-ink bi-state display in accordance with a preferred embodiment of the present invention.

The display 130 may be, for example, an electrophoretic layer or assembly comprised of a backplane 940, a top plane 950, and an electrophoretic material 960 positioned in between the two. In a preferred embodiment, the bottom plane 940 is an electrical circuit layer and the top plane 950 is a transparent conductive plastic layer. In a preferred embodiment, the display is an E-Ink bistable display based on electrostatic charges used to affect tiny spheres suspended in a plane, which is described with reference to FIG. 8A. The spheres 910 are electrostatically charged with a black half 920 carrying the negative charge and a white half 930 carrying the positive charge. Two electrodes surround the plane; the front one transparent. When a charge is placed across the electrodes the spheres rotate to align with the front-to-back charge gradient. Because the spheres are suspended in a semi-solid when the power is removed, they remain in that position and the display continues to show whatever design or text it showed before power was removed.

Figure 8B:
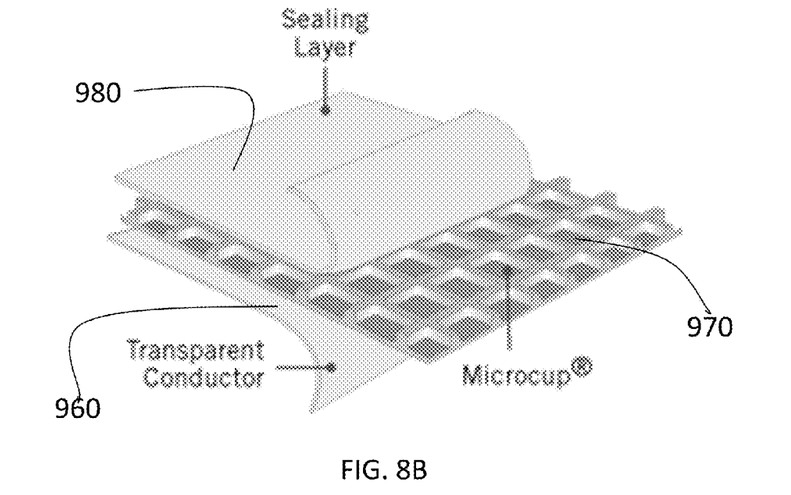
FIG. 8B is a cross sectional view of an electrophoretic bi-state display in accordance with a preferred embodiment of the present invention.

In another embodiment, an SiPix display is used. The SiPix display, shown in FIG. 8B, is a variant of a plastic Electrophoretic display that is thin and flexible and uses a microcup structure to hold electronic ink stable. SiPix's microcup technology involves a microscale container which holds minute quantities of fluid and particles.

The display structure, typically 150 μm thin, is built upon a flexible PET plastic substrate, which may include a transparent conductor 960 such as Indium Tin Oxide (ITO). The contents of the microcup 970 are hermetically sealed by sealing layer 980 to protect them from the environment. Similar electrodes on both either side change position and orientation of material suspending in a gel like fluid. SiPix is also an Electrophoretic a reflective display that uses electrophoresis to switch pixels or segments on and off. Electrophoresis is the motion of charged particles suspended in a liquid in response to an electric field. If the white particles migrate to the visible surface, the display exhibits the color white.

Figure 8C:
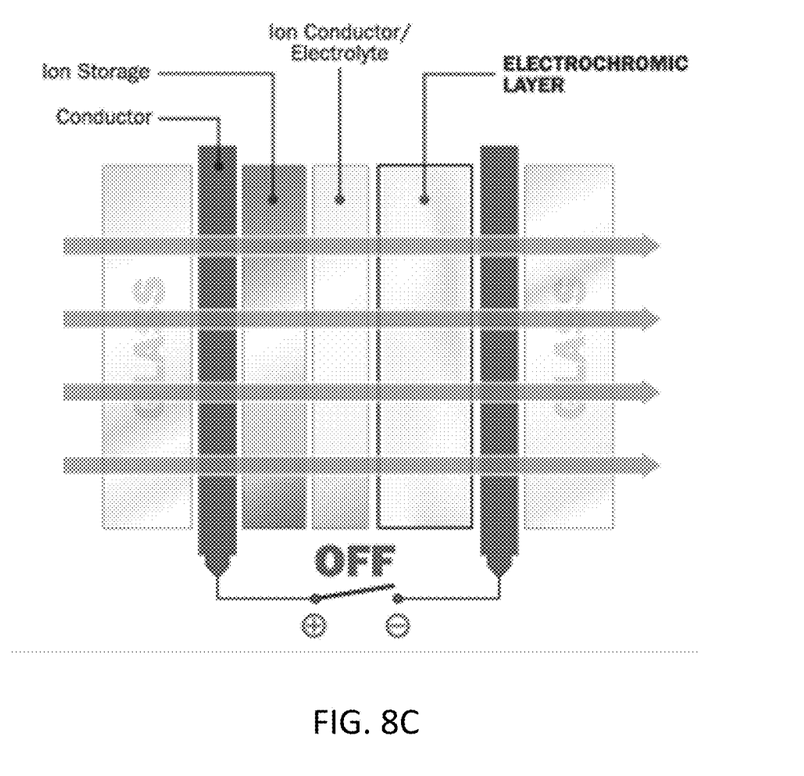
FIG. 8C is a cross sectional view of an electrochromatic bi-state display in accordance with a preferred embodiment of the present invention.

In yet another embodiment, the bi-state display is a spiral crystal LCD technology that reflects almost all the image light cast on it while attenuating most of the ambient light to produce a bright reflected display. Cholesteric materials are liquid crystal that is a type of liquid crystal with a helical (smooth curve like a spiral) structure. Cholesteric liquid crystals are also known as chiral nematic liquid crystals have molecules that maintain their orientation. Some substances exist in an odd state that is similar to both liquid and solid. When they are in this state, the molecules tend to maintain their orientation, like solids, but can also move like a liquid. Liquid crystals are such materials. However, in essence they are more like a liquid and require only a little heat to move from this odd state to a liquid state. A feature of liquid crystals is that they are affected by electric currents. Depending on the temperature and particular nature of a substance, liquid crystals can be in one of several distinct phases, including nematic phase and the cholesteric phase. LCDs use these types of crystals because they react predictably to electric current in such a way as to control light passage In still another embodiment, an electrochromic display is used. The display is comprised of a layer of electrochromic material sandwiched between two electrode layers, as shown in FIG. 8C. The material changes from one color to another when stimulated by an electric current. The top electrode layer is made from transparent plastic, so the display can be seen clearly through it.

The chemical reaction at work is an oxidation reaction—a reaction in which molecules in a compound lose an electron. Ions in the sandwiched electrochromic layer are what allow it to change from opaque to transparent. It's these ions that allow it to absorb light. A power source is wired to the two conducting oxide layers, and a voltage drives the ions from the ion storage layer, through the ion conducting layer and into the electrochromic layer. This makes the glass opaque. By shutting off the voltage, the ions are driven out of the electrochromic layers and into the ion storage layer. When the ions leave the electrochromic layer, the window regains its transparency.

In various embodiments, the smart label may be coupled power from the battery unit reader coil to inductively couple power and sensor data output inductively to the coil in the smart label. The power provides the ability to continually or periodically do "health monitoring" of the internal performance or operational ranges of the battery unit. Sensors may include temperature, humidity, shock & vibration using an accelerometer MEMS sensor, depth of battery discharge or overcharge, the number of times the battery units have been charge, etc.

The bi-state display has merit in the fact that during a catastrophic failure of the battery the label will loose its host power but the display provides a means of visually identifying the last performance or recharge cycle count prior to failure. Since the smart label has an internal non-volatile memory such as EEPROM, FLASH, or EPROM, a second level if diagnostic data can be recovered using an RFID reader. Similar to the display memory, only a trusted entity can modify or change this internal non-volatile label memory.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A smart label for a battery comprising:
a housing;
a processor;
an antenna;
a bi-state display; and
a sensor for sensing battery environment data;
wherein said processor receives battery status data from said battery through said antenna and displays said battery status data on said bi-state display.

2. A smart label for a battery according to claim 1 wherein said battery status data received from said battery comprises one of a number of recharge cycles of said battery, temperature of said battery and percentage of total battery discharge.

3. A smart label for a battery according to claim 1, wherein said processor is powered by energy received through said antenna and a state of said bi-state display is changed using energy received through said antenna.

4. A smart label for a battery according to claim 1, wherein said processor is powered by energy received through said antenna and a state of said bi-state display is changed using energy received through said antenna.

5. A smart label for a battery according to claim 1, further comprising means for receiving power from inside said battery through a sealed casing of said battery.

6. A smart label for a battery according to claim 5, wherein said means for receiving power comprises a secondary coil for receiving energy from an RFID energy coil inside said battery.

7. A smart label for a battery according to claim 1, further comprising a tamper evident seal.

8. A smart label for a battery according to claim 7, wherein said tamper evident seal comprises a holographic film.

9. A smart label for a battery according to claim 1 wherein said bi-state display comprises a multi-line display.

10. A smart label for a battery according to claim 1, wherein said sensor comprises one of a temperature sensor, a humidity sensor, an accelerometer, and a shock sensor.

11. A smart label for a battery according to claim 1 further comprising non-volatile memory, wherein said processor stores diagnostic battery data in said non-volatile memory.

\* \* \* \* \*